US008225936B2

(12) United States Patent
Bligh et al.

(10) Patent No.: US 8,225,936 B2
(45) Date of Patent: Jul. 24, 2012

(54) METHOD AND APPARATUS FOR DIVIDING A STREAM OF SOLIDS

(75) Inventors: Roger Bligh, Frankfurt am Main (DE); Pekka Hiltunen, Frankfurt am Main (DE); Cornelis Klett, Koblenz (DE); Michael Missalla, Oberursel (DE); Bernd Reeb, Friedrichsdorf (DE); Lilli Sacharow, Oberersel (DE); Michael Stroeder, Neu-Anspach (DE); Peter Sturm, Karben (DE)

(73) Assignee: Outotec Oyj, Espoo (FI)

( * ) Notice: Subject to any disclaimer, the term of this patent is extended or adjusted under 35 U.S.C. 154(b) by 90 days.

(21) Appl. No.: 12/529,020

(22) PCT Filed: Jan. 23, 2008

(86) PCT No.: PCT/EP2008/000491
§ 371 (c)(1),
(2), (4) Date: Mar. 11, 2010

(87) PCT Pub. No.: WO2008/104251
PCT Pub. Date: Sep. 4, 2008

(65) Prior Publication Data
US 2010/0163465 A1 Jul. 1, 2010

(30) Foreign Application Priority Data
Feb. 27, 2007 (DE) .................. 10 2007 009 759

(51) Int. Cl.
*B07B 4/00* (2006.01)
*B04C 5/24* (2006.01)

(52) U.S. Cl. ........ 209/154; 209/133; 209/136; 209/138; 209/711

(58) Field of Classification Search .................. 209/133, 209/136, 138, 154, 711; 406/93, 152, 153
See application file for complete search history.

(56) References Cited

U.S. PATENT DOCUMENTS
2,881,133 A * 4/1959 Whiteley et al. .............. 208/164
(Continued)

FOREIGN PATENT DOCUMENTS
DE 3107711 10/1982
(Continued)

OTHER PUBLICATIONS
International Search Report for PCT/EP2008/000491, mailed on Apr. 8, 2008.

*Primary Examiner* — Terrell Matthews
(74) *Attorney, Agent, or Firm* — Leydig, Voit & Mayer, Ltd.

(57) ABSTRACT

A method for dividing a stream of solids includes discharging the stream of solids via a first downer. The stream of solids are fluidized at a bottom of the first downer by supplying a first conveying gas. By the first conveying gas, a part of the stream of solids are conveyed to a top of a first riser branching off from the first downer. A remaining part of the stream of solids are discharged via a second downer adjoining the first downer. The remaining stream of solids are fluidized at a bottom of the second downer by supplying a second conveying gas. By the second conveying gas, a part of the remaining part of the stream of solids are conveyed to a top of a second riser branching off from the second downer.

24 Claims, 2 Drawing Sheets

U.S. PATENT DOCUMENTS

| | | | |
|---|---|---|---|
| 4,402,754 A | 9/1983 | Schmidt et al. | |
| 5,150,729 A | 9/1992 | Frank et al. | |
| 5,269,263 A * | 12/1993 | Garcia-Mallol | 122/4 D |
| 6,202,576 B1 | 3/2001 | Nagl et al. | |
| 6,666,629 B2 * | 12/2003 | Hirsch et al. | 406/197 |
| 6,764,253 B1 * | 7/2004 | Pfeiffer | 406/11 |
| 7,021,870 B2 * | 4/2006 | Gille et al. | 406/93 |
| 2005/0058516 A1 | 3/2005 | Gille et al. | |

FOREIGN PATENT DOCUMENTS

| | | |
|---|---|---|
| DE | 3724287 | 2/1988 |
| EP | 0488433 | 6/1992 |
| EP | 0599760 | 6/1994 |
| WO | WO-9716244 | 5/1997 |
| WO | WO-0128900 | 4/2001 |

* cited by examiner

METHOD AND APPARATUS FOR DIVIDING A STREAM OF SOLIDS

CROSS REFERENCE TO PRIOR APPLICATIONS

This application is a U.S. National Phase application under 35 U.S.C. §371 of International Application No. PCT/EP2008/000491, filed on Jan. 23, 2008 and which claims benefit to German Patent Application No. 10 2007 009 759.1, filed on Feb. 27, 2007. The International Application was published in English on Sep. 4, 2008 as WO 2008/104251 A1 under PCT Article 21(2).

FIELD

The present invention relates to a method and an apparatus for dividing a stream of solids withdrawn from a cyclone, fluidized-bed tank or the like.

BACKGROUND

During the treatment of granular solids such as sulfidic zinc ore, iron ore, sponge iron or aluminum hydroxide in a fluidized-bed tank, the solids are fluidized by supplying a fluidizing gas and are treated, for instance, roasted, calcined, heated, reduced, burnt, gasified or cooled, corresponding to the desired application. In the case of the circulating fluidized bed, a recirculation cyclone regularly is provided downstream of the fluidized-bed reactor, from which the flue gases are conducted to the top, while the treated solids are recirculated downwards into the fluidized-bed tank. A partial stream of the solids is branched off as product or residue and possibly supplied to a desired further treatment stage.

DE 31 07 711 A1 describes a method for producing cement clinker, in which raw cement powder, which has been preheated in a suspension-type heat exchanger, is supplied to a circulation system for calcination. The circulation system comprises a fluidized-bed reactor, a recirculation cyclone, and a return conduit. In the fluidized-bed reactor, the cement raw meal is fluidized by means of fluidizing gas and calcined by combustion of a fuel introduced through a lance. Upon separation of the solids in the recirculation cyclone, a continuous stream of material is withdrawn via a aperture blocker-controlled withdrawal device and is supplied to a second circulation system, which in turn includes a fluidized-bed reactor, a recirculation cyclone and a return conduit. In the second circulation system, clinkering is effected by heating with a comparatively small amount of fuel.

The so-called aperture blocker used in the withdrawal device is a mechanical solids valve in the form of a lance with a conical tip which fits into a corresponding conically shaped opening of the tank wall. By withdrawing or inserting the lance into the opening, the cross-section is increased or reduced, so that the outflow can be controlled. However, the same pressure exists on both sides of the solids outlet, because the aperture blocker can effect a pressure seal only in the completely closed condition. In general, this will be the pressure of the fluidized bed at the level of the solids outlet. If a differential pressure over the solids outlet is obtained as a result of the switching of the process and/or the respective operating condition, a deterioration of the control quality must be expected.

EP 0 488 433 B1 describes a control aperture blocker for opening and closing a gas passage.

Such control aperture blockers are functioning in practice, but they have their weaknesses and disadvantages. On the one hand, the control aperture blocker has mechanically moving parts, which are in contact with hot solids. Therefore, it must be cooled by water cooling. Here, the flow rate of the cooling water and the temperature difference between forward flow and return flow must be monitored. Occasionally, a damage of the lance occurs. Then, water escapes from the lance and, in the worst case, flows into the tank located below the same, which has a refractory lining, whereby said refractory lining can be damaged. In addition, the lance must be moved laterally, with the drive on the outside having ambient pressure and the interior typically having excess pressure. For sealing purposes, a stuffing box is used. If the same becomes leaky, hot solids probably will be discharged, which represents a safety hazard, or ambient air will enter, which can disturb the process. To adjust the stream of solids discharged via the aperture blocker, an exact adjustment is required between the tip of the lance and the nozzle stone acting like a valve seat. It should be considered here that after extended operating periods the high temperatures can effect a displacement of the refractory lining, so that this exact adjustment can get lost. It can also occur that after an extended period with closed aperture blocker, the solids are defluidized before the tip of the aperture blocker and do not move upon opening the aperture blocker. In many cases, a manually handled air lance, which is moved through another stuffing box, can then be used for poking and at the same time fluidizing the solids. The success or failure of such poking typically can be observed through an inspection glass. When the solids are so hot that they are glowing, something can be seen. But if they are cold, nothing can be seen and one is working blind, so to speak. In the case of hot solids, however, the inspection glass withstanding the high temperatures is very expensive. Moreover, with a control aperture blocker a pressure seal cannot be realized by means of the control device. This can lead to gas/air flows through the nozzle stone, in the worst case also against the direction of the solids flow, whereby the solids flow can be delimited or even be inhibited completely.

Another disadvantage of such aperture blockers consists in that they only function in a downward direction, because gravity is required to move the solids horizontally through the opening of the nozzle stone.

U.S. Pat. No. 6,666,629 describes a method for conveying granular solids in which the solids are conveyed by means of a gaseous medium from a first zone with a pressure of 4 to 16 bar through a descending conduit and then via an ascending conduit to a second zone with a pressure lower than in the first zone by 3 to 15 bar. The inflow of the gaseous medium is effected through an upwardly directed nozzle at the point where the descending conduit opens into the ascending conduit.

WO 01/28900 A1 describes an apparatus in which solids are passed through a downer to an ascending conduit, through which they are conveyed by means of conveying gas and then are withdrawn at the bottom upon deflection. The solids are fluidized both in the descending conduit and in the riser along the entire length thereof and thereby are conveyed by gravity like a fluid in communicating tubes.

US 2005/0058516 A1 describes an apparatus for the transport of fine-grained solids with a controlled flow rate, wherein the solids initially flow downwards through a downer as a result of gravity and then are transported to a riser via an inclined transfer conduit by injecting a secondary gas, in which riser air is introduced from below, in order to convey the particles to the top. The downer and the riser accordingly are not directly connected with each other.

The last-mentioned methods and apparatuses have in common that the stream of solids is not divided.

SUMMARY

An aspect of the present invention is to provide for a simple and reliable division of a stream of solids. An additional, alternative, aspect is to provide a reliable pressure seal.

In an embodiment, the present invention provides a method for dividing a stream of solids includes discharging the stream of solids via a first downer. The stream of solids are fluidized at a bottom of the first downer by supplying a first conveying gas. By the first conveying gas, a part of the stream of solids are conveyed to a top of a first riser branching off from the first downer. A remaining part of the stream of solids are discharged via a second downer adjoining the first downer. The remaining stream of solids are fluidized at a bottom of the second downer by supplying a second conveying gas. By the second conveying gas, a part of the remaining part of the stream of solids are conveyed to a top of a second riser branching off from the second downer.

BRIEF DESCRIPTION OF THE DRAWINGS

The present invention is described in greater detail below on the basis of embodiments and of the drawings in which.

DETAILED DESCRIPTION

In an embodiment of the present invention, the supply of the conveying gas at the bottom of the first and/or second downer is varied via a control means. Here, it is important that the supply of conveying gas is varied at the bottom of the second downer. In this way, the solids mass flow discharged through the second riser is determined. The solids mass flow through the first riser then is obtained automatically, and the first riser and its conveying gas flow should be designed such that the entire stream of solids can be discharged, if the second conveying route is completely switched off. Of course, a variability of the supply of conveying gas at the bottom of the first downer can also be provided in order to minimize, for instance, the demand of conveying air and hence fan power. Alternatively, it is also possible to only vary the fluidization of the first riser, in which case the second riser would have to discharge everything not discharged by the first riser.

As a control variable for the supply of conveying gas to one of the downers, the pressure difference over the fluidized-bed tank can be used in accordance with the present invention. Alternatively, there can also be made an ultrasonic measurement of the solids level or a weight measurement of the solids tank. It also lies within the scope of the present invention to vary the volume flow ratio of the conveying gas to the first riser and of the conveying gas to the second riser, for instance, if the sum of these two volume flows is constant.

In a stationary fluidized bed, the fluidized solids bed behaves like a fluid and thus generates a hydrostatic pressure, which is proportional to the height of the fluidized bed. In the case of a circulating fluidized bed, a level is not defined, because the fluidized bed fills up the entire fluidized-bed reactor. The pressure difference then is proportional to the solids inventory of the fluidized-bed reactor. In accordance with the present invention, the pressure difference signal is utilized for actuating a control valve via a control circuit and thereby determine the supply of the conveying gas. If the pressure difference in the fluidized-bed tank becomes too large, the valve for the conveying gas of the second riser is opened more and the conveying gas flow is increased, so that more solids are removed from the system via the second riser, whereas the first riser recirculates less solids into the fluidized bed. When the pressure difference is decreasing, the conveying gas flow to the second riser is reduced, which leads to a corresponding reduction of the solids mass flow in the second riser and hence to an increase of the level in the fluidized bed.

As in the case of a control of the differential pressure in the fluidized-bed reactor by varying the supply of conveying gas to the second downer, the mass flow discharged via the first riser is controlled automatically, the supply of the conveying gas at the bottom of the first downer can be kept constant in accordance with an embodiment. For this purpose, this conveying gas flow should be dimensioned sufficiently in order to be able to convey the total solids mass flow to be expected maximally through the first riser.

In accordance with the present invention, the pressure difference between the bottom and the top of each downer is kept smaller than the pressure loss corresponding to a fluidized downer. If, as likewise provided in accordance with the present invention, the pressure at the bottom of the first and/or second downer is kept greater than the pressure at the top of this downer, the solids in the downer behave like a sinking bed with a porosity close to that of a fixed bed. Thus, a non-fluidized, traversed moving bed is present in the downer.

The pressure difference of the first downer, $\Delta P_{D1}$, here is defined by $$\Delta P_{D1} = \Delta P_{R1} + P_{R1,K} - P_{Z0} > 0 \qquad (1)$$

The pressure difference of the second downer, $\Delta P_{D2}$, is defined by $$\Delta P_{D2} = \Delta P_{R1} + P_{R1,K} - \Delta P_{R2} - P_{R2,K} > 0 \qquad (2)$$

Here, $\Delta P_{R1}$ is the pressure loss over the first riser, which depends on the conveying gas flow and the solids mass flow. The pressure loss of the first riser is obtained as a function of solids mass flow and conveying gas supply.

$P_{R1,K}$ is the pressure at the top of the first riser, which in the case of a recirculation of solids into a fluidized bed mostly is equal to the pressure in the fluidized bed at the point where the first riser is connected to the fluidized-bed tank. This pressure need not be constant, because it depends, for instance, on the variable solids inventory of the fluidized-bed tank. The pressure can also be much higher than the ambient pressure. If the second riser opens into an expansion tank, ambient pressure exists there in many cases. The pressure can vary, however, for instance when the exhaust air extraction of a fluidizing channel is too strong and a negative pressure is generated. If a further process part is provided downstream of the second riser, the pressure $P_{R2,K}$ can also be much higher than the ambient pressure, for instance, also higher than the pressure in the fluidized bed.

When recirculating solids into a fluidized-bed tank, the pressure $P_{Z0}$ in the cone of the recirculation cyclone subsequent to the first downer should additionally be considered. This pressure is dependent on the plant behavior of the cyclone and of possibly preceding further apparatuses. Thus, the pressure difference $\Delta P_{D1}$ is obtained automatically via the first downer.

The pressure difference $\Delta P_{D2}$ is obtained as a difference of the back pressure from the first riser (sum of the pressure at the top of the first riser and the pressure loss through the first riser) and the pressure loss $\Delta P_{R2}$ of the second riser plus the pressure at the top of the second riser $P_{R2,E}$. Thus, this pressure difference is dependent on the pressure at the bottom of the first riser and at the top of the second one. As the conveying gas flow of the second riser varies, the pressure difference of the second riser is obtained as a function of the conveying gas flow.

For both downers it can be stated that the pressure differences should also not become greater than those to be obtained if they were fluidized. This would mean that the porosity in the downer would increase and the back pressure from the riser, or also from the fluidized-bed tank, no longer could be sealed reliably. This is expressed by $$\Delta P_{Di} < \Delta P_{Di,max} = (1-\epsilon_{mf}) \cdot \rho_S \cdot g \cdot H_{Di} \quad (2)$$

wherein
$\epsilon_{mf}$=porosity of the solids in the fixed-bed condition
$\rho_s$=solids density
g=gravitational acceleration
$H_{Di}$=height of the respective riser i Under these conditions, the bed in the downer acts as a pressure seal, and the pressure at the top of the riser is uncoupled from the pressure at the inlet of the downer. Furthermore, the solids mass flow conveyed or the bed height and the solids inventory in the fluidized-bed tank can now be adjusted or controlled at the second riser by varying the conveying air. The conveying gas, such as air, for the major part flows upwards in the risers and transports so much solids to the top as corresponds to their load-bearing capacity. A minor part of the conveying gas traverses the moving bed in the downers and thereby causes the pressure loss in the downers.

Below the first and second risers, the conveying air is supplied via at least one conveying gas nozzle each. For this purpose, in principle any suitable nozzle or gas supply can be provided, for instance a cap-type nozzle or a nozzle directed upwards, at whose upper end, for example, a porous, gas-permeable medium such as a membrane can be disposed, which is traversed by the conveying gas flow, or for instance, a suitably mounted orifice plate.

In an embodiment of the present invention, the conveying gas is supplied below the riser via at least one downwardly directed nozzle. Thereby, a blockage of the nozzle can reliably be prevented.

In certain applications, it may be necessary that different gas atmospheres are adjusted in the fluidized-bed tank and in the discharge tank of the second riser. A mixing of these gas atmospheres generally is undesirable. To ensure a gas seal between the fluidized-bed tank and the discharge tank of the second riser, a third gas, for example, an inert gas such as nitrogen, can be used as conveying gas in accordance with the present invention.

In an embodiment of the present invention, the conveying gas flow, in particular into the second downer, can be greatly reduced. In this case, a reliable interruption of the solids mass flow can be obtained by the great reduction of the conveying gas flow in the second riser. Experiments have shown that even with great pressure differences between the fluidized-bed tank and the head of the second riser, the solids no longer will flow as soon as the conveying gas flow becomes smaller than necessary for a minimum fluidization in the riser. In the second riser, a traversed fixed bed then is obtained. Such traversal provides for the separation of the gas atmospheres between the fluidized-bed tank and the riser head, which may be necessary depending on the application. If the conveying gas flow is interrupted completely, solids likewise will remain in the risers as a fixed bed. However, a traversal with the gas from one of the tanks may occur, because the gas will flow from the higher to the lower pressure. For the respective application, it should be decided whether this is disadvantageous.

In principle, all fluidizable solids can be transported with the arrangement in accordance with the present invention. In general, however, the particle size of the solids to be conveyed should not be greater than 10 mm, for example, not greater than 3 mm or not greater than 0.3 mm Iron ore, for instance, is processed with a grain size up to 10 mm, plastics granules have, for example, a grain size of 2 to 6 mm, whereas alumina is processed, for example, with a grain size <0.3 mm.

The present invention also extends to an apparatus for dividing a stream of solids with the features of claim 10.

In accordance with the present invention, the variation in particular of the second conveying gas supply can be effected via a control valve, the open position of the control valve being used for controlling, for example, the pressure difference over the fluidized-bed tank via a control circuit.

In an embodiment of the present invention, the supply of the conveying gas flow is effected via at least one nozzle which is, for example, downwardly inclined. Alternatively, the supply of the conveying gas flow can also be effected via a fluidizing cloth or some other porous medium.

In an embodiment of the present invention, the downers are inclined by not more than 45° with respect to the vertical in order to provide for the solids descending gradually in the downers without fluidization.

On the other hand, the risers can be arranged, for example, approximately vertically. The discharge of solids through the risers thereby can be facilitated.

In an embodiment of the present invention, the height in particular of the second riser can be greater than the height of the associated downer or even additionally greater than the height of the first and second downers together. Thus, height can also be gained by means of the present invention, i.e. the solids can be conveyed to the top. In plant construction, this is highly advantageous because the various process stages no longer must be built one on top of the other, but can also be erected one beside the other. In this way, construction height and hence costs are saved.

To be able to adjust the desired flow regime in the risers, which is very similar to that of a dense fluidized bed, the diameters of the downers should be greater than or equal to the diameter of the associated risers. The diameters of the downers should be, for example, 1.5 to 3 times the diameter of the risers, usually twice as great as the diameter of the associated risers. It is not necessary that both downers have the same diameter. Rather, it may be expedient to design the second downer with a smaller diameter than the first one. The two risers also can have different diameters and also different lengths. Furthermore, it is not necessary that the downers or risers are always cylindrical. Oval, angular etc. embodiments are also possible. The diameter then always refers to an equivalent diameter of a round tube with the same cross-sectional area. It is also possible that the diameters or shapes of the downers and risers are changing along their course.

In an embodiment of the present invention, the first riser opens into the fluidized-bed tank for recirculating the stream of solids, possibly upon deflection by means of an elbow or the like.

Depending on the application, the second riser can open into a discharge pot or another process stage. If no recirculation into the fluidized-bed tank is desired, the first riser can also open into a discharge pot or another process stage.

In an embodiment of the present invention, the temperature of the solids in the downers and/or risers can be influenced in that heat exchangers are provided in the downer and/or in the riser. In the case of inside heat exchangers, the diameter of the risers should be adjusted such that the ratios of free cross-sectional area between downer and riser again correspond to the required relations. Alternatively the downers and/or risers themselves can constitute heat exchangers.

In an embodiment of the present invention, a plurality of further downers are provided downstream of the first downer, at the bottom of each of which conveying gas is supplied, in order to conduct a partial stream of the solids to the top via a riser branching off from the respective downer. These series-connected further seal pots substantially are designed like the first seal pot. Here, the further risers can branch off from a common downer at various levels or at the same level. When branching off at various levels, the common downer then can be reduced in diameter portion by portion, corresponding to the individual solids mass flows.

In an embodiment of the present invention, a plurality of further downers can be provided in parallel downstream of the first downer. This can be effected for instance via a Y-piece, which divides the stream of solids leaving the first downer in downward direction in two partial streams. In such a case, a plurality of variables can then be controlled by means of the present invention. In the case of four separate downers, for instance, the level in the fluidized-bed tank can be controlled on the one hand by varying the supply of conveying gas to the first one of the further risers, whereas in the discharge tanks of the second, third and fourth further risers three levels and/or mixing temperatures are controlled. The riser diameters can all be different, and the riser heads all can be located at different levels and have different pressures. The pressures at the riser heads also can differ from the pressure at the inlet of the downers. In addition, the gas atmospheres in the fluidized-bed tank and in the four discharge tanks can be different, and gas seals are possible between all five tanks. Here, it is also possible to normally not use one or more of the downers and only use the same as an additional conveying means when a critical solids level in the fluidized-bed tank is exceeded. Switching between various recipient vessels of the solids discharged from the fluidized bed so far has only been possible via a mechanical switch. By means of the present invention, the contact of movable parts with the hot solids can be avoided, and the resulting wear, which leads to a reduction of the control accuracy or an increased maintenance effort, can be avoided.

Figure 1:
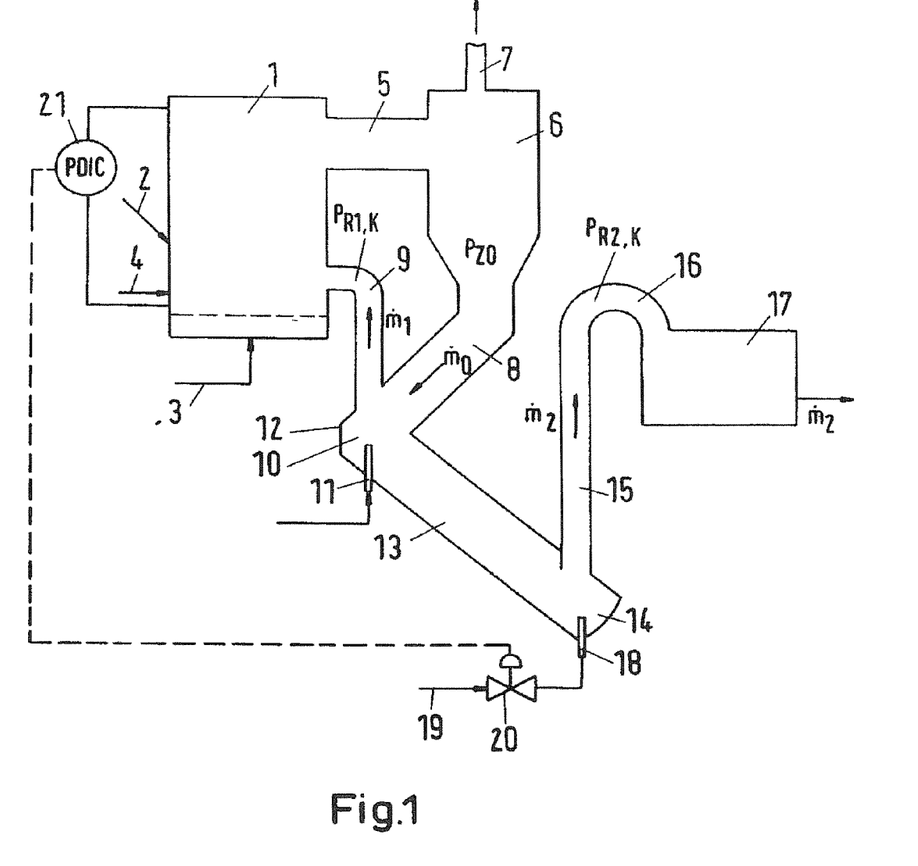
FIG. 1 schematically shows an apparatus in accordance with an embodiment of the present invention, and FIG. 2 schematically shows an apparatus in accordance with an embodiment of the present invention.

FIG. 1 shows an apparatus for dividing a stream of solids, which is withdrawn from the recirculation cyclone 6 of a circulating fluidized bed, in accordance with an embodiment of the present invention. Instead of the recirculation cyclone 6, another tank containing solids can also be used. Fluidizable solids should be received in the tank.

A fluidized-bed tank 1 contains a fluidized bed of, for example, fine-grained solids, such as alumina, iron ore or plastics granules, with a mean grain size below 10 mm, for example, from 0.1 to 5 mm or from 0.05 to 1 mm.

The solids are introduced into the fluidized-bed tank 1 via a supply conduit 2. The fluidized bed is fluidized by means of primary air, which is supplied to a gas distributor via a conduit 3 and traverses the fluidized bed from below. Fuel is supplied via a conduit 4.

Via a discharge conduit 5, the heat-treated solids are supplied to a recirculation cyclone 6, in which the flue gases are separated and conducted to the top via a conduit 7.

At the bottom of the recirculation cyclone 6, the stream of solids $\dot{m}_0$ is discharged via a first descending conduit inclined downwards by not more than 45° with respect to the vertical, which also is referred to as first downpipe 8 or first downer. From the first downer 8, a first conduit directed upwards substantially vertically is branched off, which is also referred to as first rising pipe 9 or first riser. The first riser extends back into the fluidized tank 1. The diameter of the first riser 9 is about half as great as the diameter of the first downer 8.

Below the first riser 9, a conveying gas is introduced via at least one nozzle 11 into the region of the downer 8 defined here as bottom 10 of the first downer 8, in order to fluidize the stream of solids in the first riser 9. In principle any suitable conveying gas can be used as fluidizing gas. A third gas such as air or an inert gas such as nitrogen can be used to ensure the separation of the gas atmospheres between the fluidized bed and the head of the riser. For reasons of simplicity, the conveying gas subsequently is referred to as "propellant air". A plurality of nozzles 11 can be provided in order to supply the propellant air. The nozzle 11 is not restricted to the illustrated form of an upwardly directed nozzle. Rather, it is also possible to provide a cap-type nozzle or a downwardly directed nozzle or a nozzle with a porous body provided at its end, which should prevent plugging of the nozzle. It is also possible to supply the conveying gas via a fluidizing cloth or other porous medium, which is disposed at the bottom of the downer above a gas distributor not illustrated here. A person skilled in the art can take all measures known to him for a suitable fluidization of the solids at the bottom of the downer 6.

Subsequent to the bottom 10 of the first downer 8, after a transition piece 12, a second downer 13 is provided, which likewise is inclined downwards by about 45°. Although the first downer 8 hence is not closed at the bottom, the region below the inlet (base) of the first riser 9 before the transition into the second downer 13 here is referred to as "bottom" of the first downer 8.

At the bottom 14 of the second downer 13, a second riser 15 branches off from the same, which extends upwards substantially vertically. However, a certain inclination of the riser is also possible. The diameter of the second riser 15 is about half as great as the diameter of the second downer 13. Upon deflection via an elbow 16, the second riser 15 opens into an expansion tank 17, which can be fluidized. Alternatively, it is possible that the second riser 15 opens into a discharge pot, from which solids can be discharged via a chute, or that the stream of solids is supplied to a further process stage.

Below the base of the second riser 15, close to the bottom 14 of the second downer 13, at least one nozzle 18 opens for supplying propellant air. In the conduit 19 supplying the nozzle 18 with propellant air, a control valve 20 is provided for varying the supply of propellant air. As a control variable for the control valve 20, the pressure difference over the fluidized-bed tank 1 is used, which is determined, for instance, by means of the differential pressure sensor 21. The solids inventory of the fluidized-bed tank 1 can, however, also be detected, for instance, by weighing the solids tank or by measuring the deformation of a supporting steel scaffold, so that the values obtained therefrom likewise can be used as a control variable.

The apparatus in accordance with an embodiment of the present invention is designed substantially as described above. Subsequently, its mode of operation, function and action will be explained.

Via the solids supply conduit 2, solids to be treated, such as aluminum hydroxide ($Al(OH)_3$), are supplied to the fluidized-bed tank 1, which solids are fluidized in the fluidized-bed tank 1 by the primary air supplied via conduit 3 and are calcined by combustion of the fuel supplied via the fuel conduit 4. Via the discharge conduit 5, the alumina ($Al_2O_3$) obtained is transferred to the recirculation cyclone 6, in which the solids are separated from the flue gas discharged via conduit 7. The solids are accumulated at the bottom of the recirculation cyclone 6 and, via the first downer 8, sink to the bottom 10 of the downer. By adding propellant or conveying air into the first riser 9 below the inlet opening, a partial stream $\dot{m}_1$ is conveyed to the top in the riser 9 and is recirculated to the fluidized-bed tank 1.

The remaining partial stream $\dot{m}_2$ of the stream of solids flows through the transition piece 12 and the second downer 13 to the bottom 14 of the second downer 13. By adding propellant or conveying air below the inlet opening into the second riser 15, the solids are conveyed to the top in the second riser 15 and are discharged into the expansion tank 17 via the elbow 16.

The quantity of the stream of solids $\dot{m}_2$ conveyed through the second riser 15 can be varied by supplying propellant air. This supply is controlled by means of the control valve 20 on the basis of the pressure difference in the fluidized-bed tank 1. As far as the stream of solids is not withdrawn through the second riser 15, it is accumulated in the second downer 13 and forms a traversed fixed bed. Upon fluidization via the propellant air supplied through the nozzle 11, the remaining stream of solids $\dot{m}_1 = \dot{m}_0 - \dot{m}_2$ is recirculated via the first riser 9 into the fluidized-bed tank 1. Here, the first riser 9 should be designed such that it can also recirculate the complete stream of solids $\dot{m}_0$ from the first downer 8 into the fluidized-bed tank 1, if no solids are withdrawn via the second downer 13 and the second riser 15. The adjustment of the partial stream $\dot{m}_1$ thus is effected automatically in dependence on the second partial stream $\dot{m}_2$ withdrawn via the second riser 15. Thus, the system merely requires a control of the supply of propellant air through the nozzle 18 below the second riser 15. On the other hand, the supply of propellant air through the nozzle 11 below the first riser 9 can remain constant.

The solids in the downer behave like a sinking bed with a porosity close to that of a fixed bed. In the case of a sinking conveying gas flow through the nozzle 18 and hence a sinking solids mass flow in the second riser 15, the solids no longer will flow even in the case of great pressure differences between the fluidized-bed tank 1 and the head of the second riser 15 as soon as the conveying gas flow becomes smaller than corresponds to the minimum fluidizing rate in the second riser 15. In the second downer 13 and in the second riser 15, a traversed fixed bed then is obtained. This traversal guarantees the separation of the gas atmospheres between the fluidized-bed tank and the head of the riser, which may be necessary depending on the application.

The solids mass flow in the second riser 15, whose conveying gas volume flow is connected as a control variable for controlling the solids inventory of the fluidized-bed reactor 1, is in a defined relationship with the conveying gas volume flow itself. If a flow measurement for the conveying gas is employed before the corresponding control valve 20, the solids mass flow therefore can be derived from the measured conveying gas volume flow. The solids retention time of a solids tank, for instance, also of a fluidized-bed reactor, is obtained from the ratio of solids content to solids flow rate. As in the case of a circuit as shown in FIG. 1, the solids mass flow of the second riser 15—apart from control variations—is identical with the solids flow rate of the fluidized-bed reactor, the solids retention time can even be determined and controlled in the method of the present invention. If, for example, the usually constant introduction of solids into the fluidized-bed reactor is doubled at a specific time, the inventory in the fluidized-bed reactor should also be doubled if the solids retention time is to be kept constant. Even if the introduction of solids into the fluidized-bed reactor is not measured, it can be concluded from the rise in the solids mass flow in the second riser that the flow rate of the system has been doubled. For keeping constant the solids retention time, the desired value of the control circuit for the reactor inventory then is doubled. After a transition period, twice the pressure difference of the fluidized-bed reactor is obtained. Thus, instead of the solids inventory in the fluidized bed, even the retention time of the solids in the fluidized bed can be controlled in this way.

In an embodiment of the present invention, the supply of air through the first nozzle 11 can also additionally be varied. Between the recirculation cyclone 6 and the first downer 8, a tank (for example, fluidized) can be disposed, in which the solids level can be controlled by varying the gas flow through the nozzle 11. The measurement of the level in this tank can, for example, again be effected by measuring the differential pressure. This involves the advantage that the downer 8 always is completely filled and allows to estimate the mass flow $\dot{m}_1$: the larger this mass flow, the more propellant air is required to convey the same in the first riser 9. As the mass flow $\dot{m}_2$ can be estimated via the propellant air at the second riser 15, the circulating mass flow $\dot{m}_0$ can also be calculated. In commercial circulating fluidized-bed systems, this has never been the case so far. In addition, only so much propellant air is added as is necessary at the moment. If the propellant air flow is not varied via a control valve, but by the fan speed, power is saved for the fan.

Figure 2:
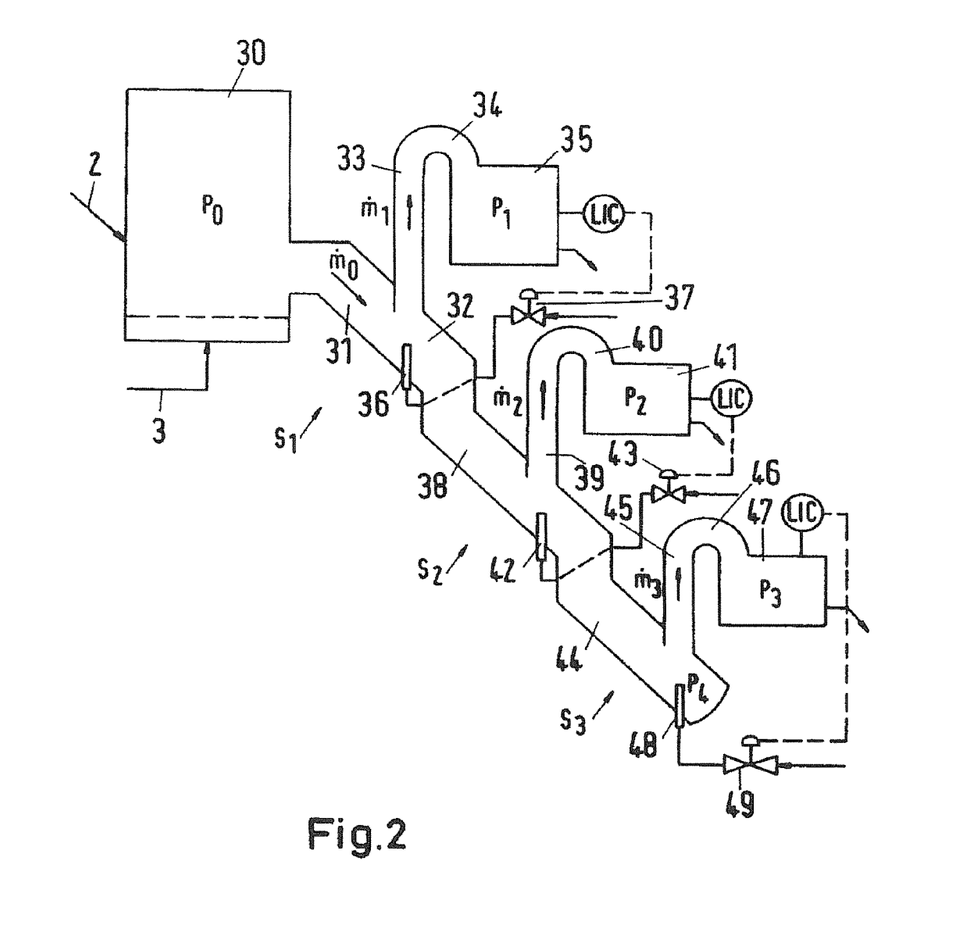

In an embodiment of the present invention shown in FIG. 2, a plurality of downer/riser assemblies (seal pots) are arranged in series. From a fluidized-bed tank 30, a first downer 31 is branched off at a defined distance from the bottom of the gas distributor (i.e. above or at its level), through this first downer a solids mass flow $\dot{m}_0$ is discharged from the fluidized bed tank 30. Near the bottom 32 of the first downer 31, a first riser 33 extending upwards substantially vertically is branched off, which via an elbow 34 opens into a first expansion tank 35. Below the inlet of the first riser 33, propellant air is supplied via a first nozzle 36, by means of which propellant air the solids in the first riser 33 are fluidized and transported to the top. The supply of propellant air via the first nozzle 36 is varied by means of a first control valve 37.

Subsequent to the bottom 32 of the first downer 31, a second seal pot S2 is provided, comprising a second downer 38 and a second riser 39 branching off from the same, which via an elbow 40 opens into a second expansion tank 41. Below the inlet of the second riser 39, propellant air is supplied via a second nozzle 42 in order to fluidize the solids in the second riser 42 and conduct them to the top. The supply of propellant air via the second nozzle 42 is varied by means of a second control valve 43.

Subsequent to the second seal pot S2, a third seal pot S3 is provided, comprising a third downer 44 adjoining the bottom of the second downer 38 and a vertically ascending third riser 45 branching off from the same, which via an elbow 46 opens into a third expansion tank 47. Below the inlet of the third riser 45, propellant air is supplied via a third nozzle 48, which conveys the fluidized solids to the top in the third riser 45. The supply of propellant air via the third nozzle 48 is varied by means of a third control valve 49.

Instead of the expansion tanks 35, 41, 47, other parts of the plant can of course also be provided corresponding to the operational requirements for the respective partial streams $\dot{m}_1$ to $\dot{m}_3$, wherein each partial stream $\dot{m}_1$ to $\dot{m}_3$ can be treated individually. Instead of the levels in the expansion tanks, temperatures can also be controlled, when, for instance, heat exchanger bundles are arranged in the expansion tanks. It is then possible to either control the solids temperature at the outlet of the expansion tank or also the outlet temperature of the medium flowing in the tubes of the heat exchanger bundle. In this way, for instance the total heat of the stream of solids flowing out of the tank 30 can be adjusted to the heat requirement of different media or partial processes by means of a corresponding distribution of the partial streams of solids.

The supply of propellant air through the nozzles 36, 42 and 48 can be varied, for instance, on the basis of the level in the expansion tanks 35, 41 and 47. This level can be determined, for instance, by means of a pressure difference over the tanks 35, 41 and 47. In this way, a specific mass flow $\dot{m}_1$, $\dot{m}_2$ and $\dot{m}_3$ through the risers 33, 39 and 45, respectively, can be achieved. At the same time, a pressure seal between the fluidized-bed tank 30 and the expansion tanks 35, 41 and 47 can be ensured: each tank can be at a different pressure level.

The series connection shown in FIG. 2 can of course be extended to any number of seal pots $S_1$ to $S_n$, which each are designed in the same way. It should be ensured, however, that the pressure $P_n$, here $P_4$, at the bottom of the last downer 44 is greater than the pressures $P_0$ in the fluidized-bed tank 30 and the pressures $P_1$ to $P_{n-1}$ in the tanks 35, 41 and 47.

EXAMPLE

In a fluidized-bed application, alumina is produced from aluminum hydroxide at high temperatures in a fluidized-bed furnace. The heat from the product should be recovered in fluidized-bed coolers for further use within the calcination process or otherwise in the alumina refinery. In the plant circuit as shown in FIG. 2, the uppermost downer is directly connected to a cyclone, similar to FIG. 1. The product is obtained with a temperature of 480° C. and is cooled by means of three media (heat recovery). For this purpose, three fluidized-bed coolers with immersed tube bundles are connected in parallel, which are each connected to one of the risers. In the first cooler, primary air for the furnace is preheated by indirect heat transfer. In the second cooler, a maximum of 32 t/h of boiler feed water is heated, and in the third cooler a maximum of 60 t/h of filter washing water is heated for the hydrate filters of the refinery. The boiler feed water has a pressure of 6 bar and enters the bundle of the second cooler with a temperature of 25° C.; the filter washing water enters the bundle of the third cooler with a temperature of 60° C. The uppermost downer has a diameter of 0.8 m. The first riser to the first cooler with the primary air bundle has a diameter of 0.4 m and is able to transport the entire product stream of about 140 t/h. Boiler feed water and filter washing water are not always available in the maximum quantity for heating. Accordingly, the heat requirement for heating these media is not constant. On the other hand, the liquid media should by all means be prevented from boiling. Therefore, the boiler feed water temperature at the outlet of the bundle in the second cooler is controlled to a temperature of 140° C. The corresponding control circuit is connected with the control valve for the conveying air nozzle of the second riser. If the boiler feed water at the outlet of the bundle has a temperature higher than 140° C., the control valve is slightly throttled. Thereupon, less alumina is transported into the second cooler, the available heat decreases, and the boiler feed water temperature at the outlet of the bundle decreases correspondingly. If the boiler feed water temperature remains below the desired temperature of 140° C., however, the control valve is opened slightly, so that more alumina is transported through the second riser into the second cooler, the heat available there increases correspondingly, and the boiler feed water temperature is increasing. Even in the case of varying mass flows of boiler feed water, the desired preheating temperature can always be adjusted. The second riser has a diameter of 0.25 m, so that a maximum of 56 t/h of alumina can be conveyed to the second cooler. In the third cooler, the filter washing water should be heated to a desired value of 95° C. Again, the water temperature is controlled at the outlet of the bundle, the associated control circuit being connected with the control valve for the conveying gas of the third riser. The third riser has a diameter of 0.15 m, so that a maximum of 32 t/h of alumina can be conveyed to the third cooler. The diameter of the second downer is 0.6 m, the diameter of the third downer 0.35 m. The conveying gas flow to the first riser is dimensioned such that the same carries away the entire stream of solids, when the risers two and three do not withdraw any solids. However, if boiler feed water and filter wash water are available for heating in the maximum quantities, the stream of solids in the first riser is reduced due to the control of the temperature of the boiler feed water and of the filter washing water, and less heat is dissipated to the primary air. If no boiler feed water or filter washing water is available, the entire product stream is passed through the first riser into the first cooler and the heat is dissipated to the primary air for the furnace. Thus, energy can be distributed in any way between the media to be heated. The utilization of the heat flows thus can be optimized. In case residual heat must then be dissipated, the outlets of the coolers can be connected to a further fluidized-bed cooler, in which the residual heat is dissipated to cooling water.

The present invention is not limited to embodiments described herein; reference should be had to the appended claims.

LIST OF REFERENCE NUMERALS 1 fluidized-bed tank
2 solids supply conduit
3 primary air conduit
4 fuel conduit
5 discharge conduit
6 cyclone separator
7 conduit
8 first downer
9 first riser
10 bottom of the first downer
11 first nozzle
12 transition piece
13 second downer
14 bottom of the second downer
15 second riser
16 elbow
17 expansion tank
18 second nozzle
19 conduit
20 control valve
21 differential pressure sensor
30 fluidized-bed tank
31 first downer
32 bottom of the first downer
33 first riser
34 elbow
35 first expansion tank
36 first nozzle
37 first control valve
38 second downer
39 second riser
40 elbow
41 second expansion tank
42 second nozzle
43 second control valve 44 third downer
45 third riser
46 elbow
47 third expansion tank
48 third nozzle
49 third control valve
$S_1$ to $S_3$ seal pots

The invention claimed is:

1. A method for dividing a stream of solids, the method comprising:
   discharging the stream of solids via a first downer;
   fluidizing the stream of solids at a bottom of the first downer by supplying a first conveying gas;
   dividing the stream of solids into a part of the stream of solids and a remaining part of the stream of solids by conveying, by the first conveying gas, the part of the stream of solids to a top of a first riser branching off from the first downer;
   discharging the remaining part of the stream of solids via a second downer adjoining the first downer;
   fluidizing the remaining stream of solids at a bottom of the second downer by supplying a second conveying gas; and
   conveying, by the second conveying gas, a part of the remaining part of the stream of solids to a top of a second riser branching off from the second downer.

2. The method recited in claim 1, wherein the stream of solids discharged via the first downer is discharged from a cyclone or a fluidized-bed tank.

3. The method recited in claim 1, further comprising varying the supply of at least one of the first conveying gas at the bottom of the first downer and the second conveying gas at the bottom of the second downer.

4. The method recited in claim 3, further comprising using a pressure difference over a fluidized-bed tank to control the supply of at least one of the first conveying gas to the first downer and the second conveying gas to the second downer.

5. The method recited in claim 1, further comprising maintaining as constant the supply of the first conveying gas at the bottom of the first downer.

6. The method recited in claim 1, further comprising maintaining a pressure difference between the respective bottom and a respective top of at least one of the first downer and the second downer smaller than a pressure loss corresponding to a fluidized downer.

7. The method recited in claim 1, further comprising maintaining a greater pressure at the respective bottom than at a respective top of at least one of the first downer and the second downer.

8. The method recited in claim 1, wherein the supplying of at least one of the first conveying gas and the second conveying gas is performed via at least one downwardly directed nozzle.

9. The method recited in claim 1, wherein at least one of the first conveying gas and the second conveying gas includes an inert gas.

10. The method recited in claim 9, wherein the inert gas is nitrogen.

11. The method recited in claim 1, further comprising interrupting the respective stream of solids in at least one of the first riser and the second riser by supplying the respective conveying gas to the respective riser at a volume flow which does not exceed a minimum fluidization rate in the respective riser.

12. An apparatus for dividing a stream of solids, the apparatus comprising:
   a first downer configured to convey the stream of solids;
   a first riser branching off from the first downer;
   a first conveying gas supply disposed at a bottom of the first downer and configured to introduce a first conveying gas into the first downer below the first riser so as to fluidize the stream of solids at the bottom of the first downer and convey a part of the stream of solids to a top of the first riser such that the stream of solids is divided into the part of the stream of solids and a remaining part of the stream of solids;
   a second downer adjoining the first downer and configured to convey the remaining part of the stream of solids from the bottom of the first downer;
   a second riser branching off from the second downer; and
   a second conveying gas supply configured to introduce a second conveying gas into the second downer below the second riser so as to convey a part of the remaining part of the stream of solids to a top of the second riser.

13. The apparatus recited in claim 12, further comprising a cyclone or a fluidized-bed tank configured to discharge the stream of solids via the first downer.

14. The apparatus recited in claim 12, further comprising a control valve configured to control the second conveying gas supply.

15. The apparatus recited in claim 12, further comprising at least one nozzle configured to effect the supply of at least one of the first conveying gas and the second conveying gas.

16. The apparatus recited in claim 15, wherein the at least one nozzle is inclined downwards.

17. The apparatus recited in claim 12, wherein a height of the first riser is greater than a height of the first downer and a height of the second riser is greater than a height of the second downer.

18. The apparatus recited in claim 12, wherein a diameter of the first downer is greater than or equal to a diameter of the first riser and a diameter of the second downer is greater than or equal to a diameter of the second riser.

19. The apparatus recited in claim 12, wherein the first riser opens into a fluidized-bed tank.

20. The apparatus recited in claim 12, wherein the second riser opens into a discharge pot.

21. The apparatus recited in claim 12, further comprising at least one further downer downstream of the first downer, wherein conveying gas is supplied at the bottom of each respective downer so as to conduct a partial stream of the stream of solids upward via a riser branching off from each respective downer.

22. The apparatus recited in claim 21, wherein the at least one further downer includes a plurality of further downers connected to each other in parallel.

23. The apparatus recited in claim 16, wherein the at least one nozzle is inclined downwards by $\leq 45°$ with respect to a vertical orientation.

24. The apparatus recited in claim 12, wherein the first riser and the second riser are disposed with a vertical orientation.

* * * * *